United States Patent [19]

Rother, deceased

[11] 3,811,389

[45] May 21, 1974

[54] GRAIN DRILL

[76] Inventor: William L. Rother, deceased, late of Rt. 1, Cyril, Okla. 73029 by Lucille S. Rother, administratrix

[22] Filed: Apr. 27, 1973

[21] Appl. No.: 355,236

[52] U.S. Cl. .............................................. 111/91
[51] Int. Cl. ............................................. A01c 5/04
[58] Field of Search ........... 111/91, 90, 74; 222/170

[56] References Cited
UNITED STATES PATENTS

| | | | |
|---|---|---|---|
| 29,691 | 8/1860 | Hariman | 111/90 |
| 818,799 | 4/1906 | Taylor | 111/90 |
| 2,543,888 | 3/1951 | Bunch | 111/74 X |
| 3,349,730 | 10/1967 | Cowell | 111/91 |

Primary Examiner—Stephen C. Pellegrino
Attorney, Agent, or Firm—Robert K. Rhea

[57] ABSTRACT

A grain drill-type mobile frame supports a plurality of coaxially aligned hollow cylinders, each containing a quantity of seed to be planted. Each cylinder is provided with a plurality of rows of circumferentially spaced spikes projecting radially outward of its periphery forming a soil penetrating punch having a passageway for depositing seeds in soil penetrated when the cylinders are lowered toward the surface of the earth and rotated about their longitudinal axis by forward movement of the frame. Gravity seed filled and emptied hoppers, secured to the inner periphery of each cylinder wall and communicating with the respective punch, are seed filled and emptied during each revolution of the cylinders. Adjustable gate means regulates the quantity of seed discharged from the cylinders to the respective punch during revolution of the cylinders.

6 Claims, 6 Drawing Figures

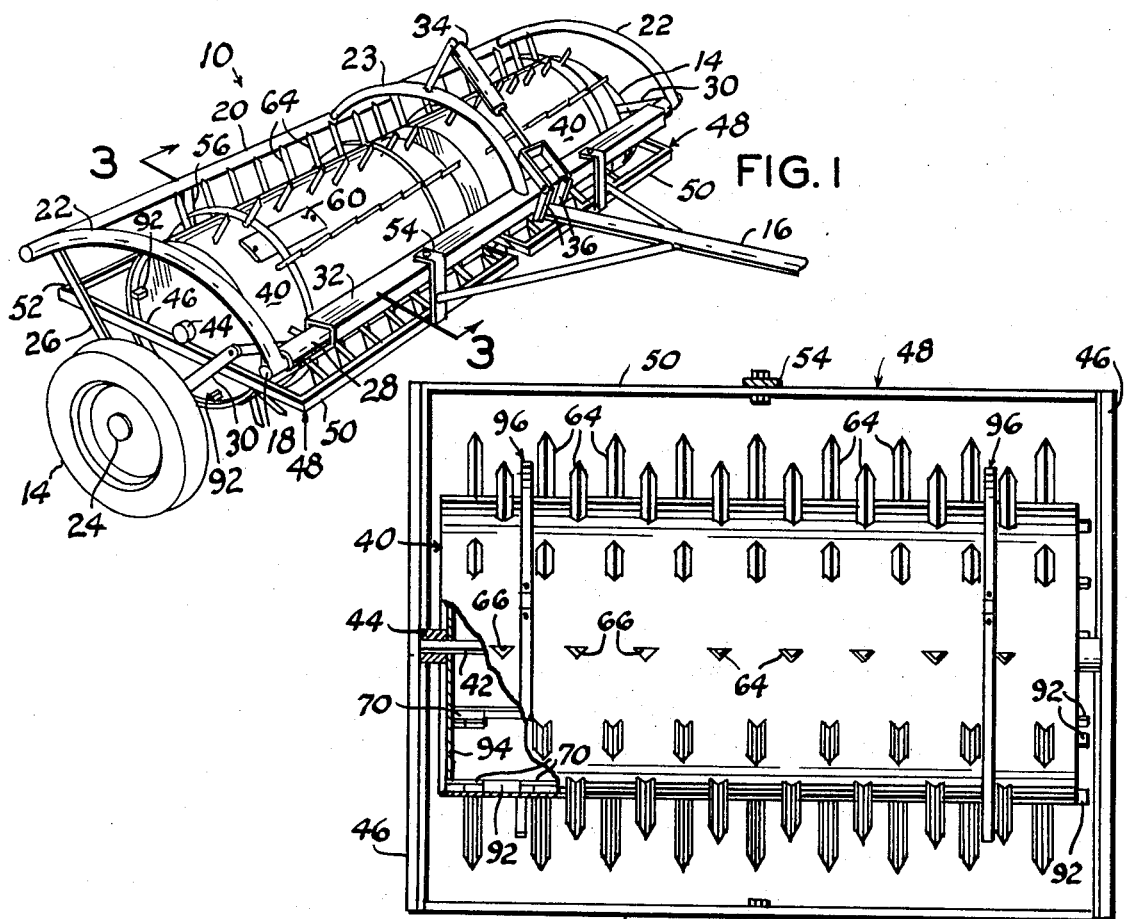
FIG. 1
FIG. 2
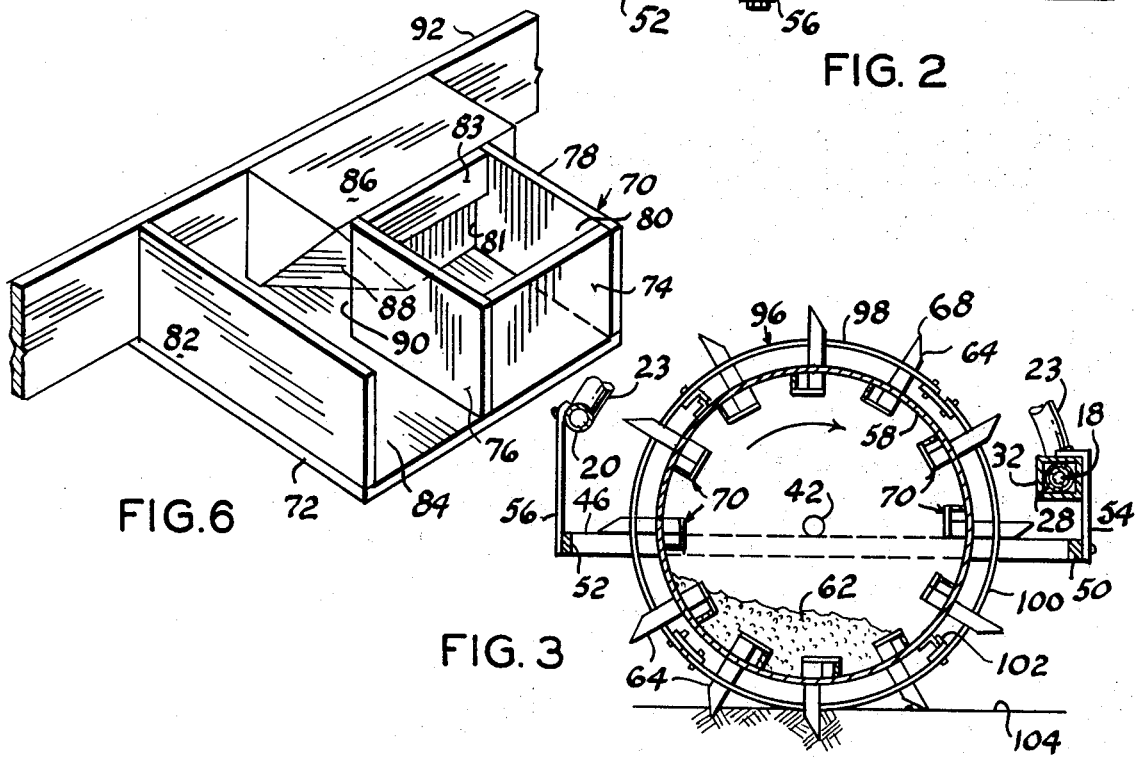
FIG. 6
FIG. 3

3,811,389

GRAIN DRILL

BACKGROUND OF THE INVENTION

1. Field of the Invention

The present invention relates to agriculture machines and more particularly to a seed planter.

A poor "stand" of livestock forage crop is sometimes obtained in tilled fields as a result of many variables, such as inclement weather, either an excess of insufficient quantity of precipitation and in such instances it is desired that a supplemental seeding be added to the crop to provide additional forage and to serve as a ground cover and minimize erosion. Similarly, some grasslands provide insufficient feed for livestock during some seasons as a result of overgrazing and/or drought conditions and where it is not feasible to till this soil and plant crops but it is desired to supplement the existing vegetation by planting grass seeds, or the like. It is important that such supplemental plantings in both tilled and untilled soil be done with a minimum of interference with existing vegetation.

2. Description of the Prior Art

Grain drills and seed planters are well known in the art, however, most of the previous drills and planters of the rotating cylinder or drum type are provided with earth engaging teeth or spikes and include internal and external cam means which longitudinally move plungers, or the like, regulating or measuring the quantity of seed supplied to the respective tooth or spike which also serves to maintain the bore of the spike free of soil as in U.S. Pat. No. 2,543,888.

Other types of planters, such as U.S. Pat. Nos. 29,691 and 99,792, employ cam means for mating and mismating seed passing ports communicating with apertures formed in the periphery of a seed containing drum during each revolution of the drum.

A gravity actuated seed planter is also disclosed by U.S. Pat. No. 655,460 which features a conterbalanced cup mounted on the interior of a seed containing drum which deposits a single seed in position to fall through an aperture in the drum wall and thereafter closes the aperture as the cylinder rotates.

This invention is believed distinctive over these and other prior art patents of this class by providing means forming juxtaposed intercommunicating chambers, each filled and emptied by gravity from a supply within a rotating cylinder with one of the chambers communicating with earth penetrating means projecting radially outward from the drum periphery wherein an externally controlled gate means is provided for controlling the quantity of seed deposited within a seed dispensing chamber.

SUMMARY OF THE INVENTION

A grain drill-type mobile frame adapted to be connected with a prime mover horizontally supports a plurality of coaxially aligned cylinders for movement toward and away from the surface of the earth. Each of the cylinders is provided with a door for receiving a supply of seed to be planted. The periphery of each cylinder is provided with a plurality of longitudinally extending circumferentially spaced rows of soil penetrating punches, each communicating with an aperture formed in the periphery of the cylinder. A plurality of hopper means, one for each punch, is secured to the inner periphery of the cylinders. Each hopper forms a juxtaposed pair of chambers arranged for intercommunication with one chamber open to the interior of the cylinder and gravity filled with seed while the other chamber is open to the aperture in the cylinder wall communicating with the respective punch for discharging seed therethrough into holes formed in the soil by the penetrating action of the respective punch.

Gate means, adjustably controlling the size of an orifice between the chambers of each hopper, is connected with a control bar, one for each row of hoppers and punches, which projects outwardly from at least one end of each cylinder for external control in setting the gate means.

The principle object of this invention is to provide a rotating cylinder gravity feed type seed planter for planting supplemental forage crops such as grain or grass seed in either cultivated or uncultivated soil which will not materially distrub or uproot existing vegetation.

BRIEF DESCRIPTION OF THE DRAWINGS

FIG. 1 is a perspective view of the device;

FIG. 2 is a top plan view, to a larger scale, with some parts removed and broken away and sectioned for clarity, of one of the rotating cylinders mounted within its floating frame;

FIG. 3 is a fragmentary vertical cross-sectional view taken substantially along the line 3—3 of FIG. 1;

DESCRIPTION OF THE PREFERRED EMBODIMENT

Figure 4:
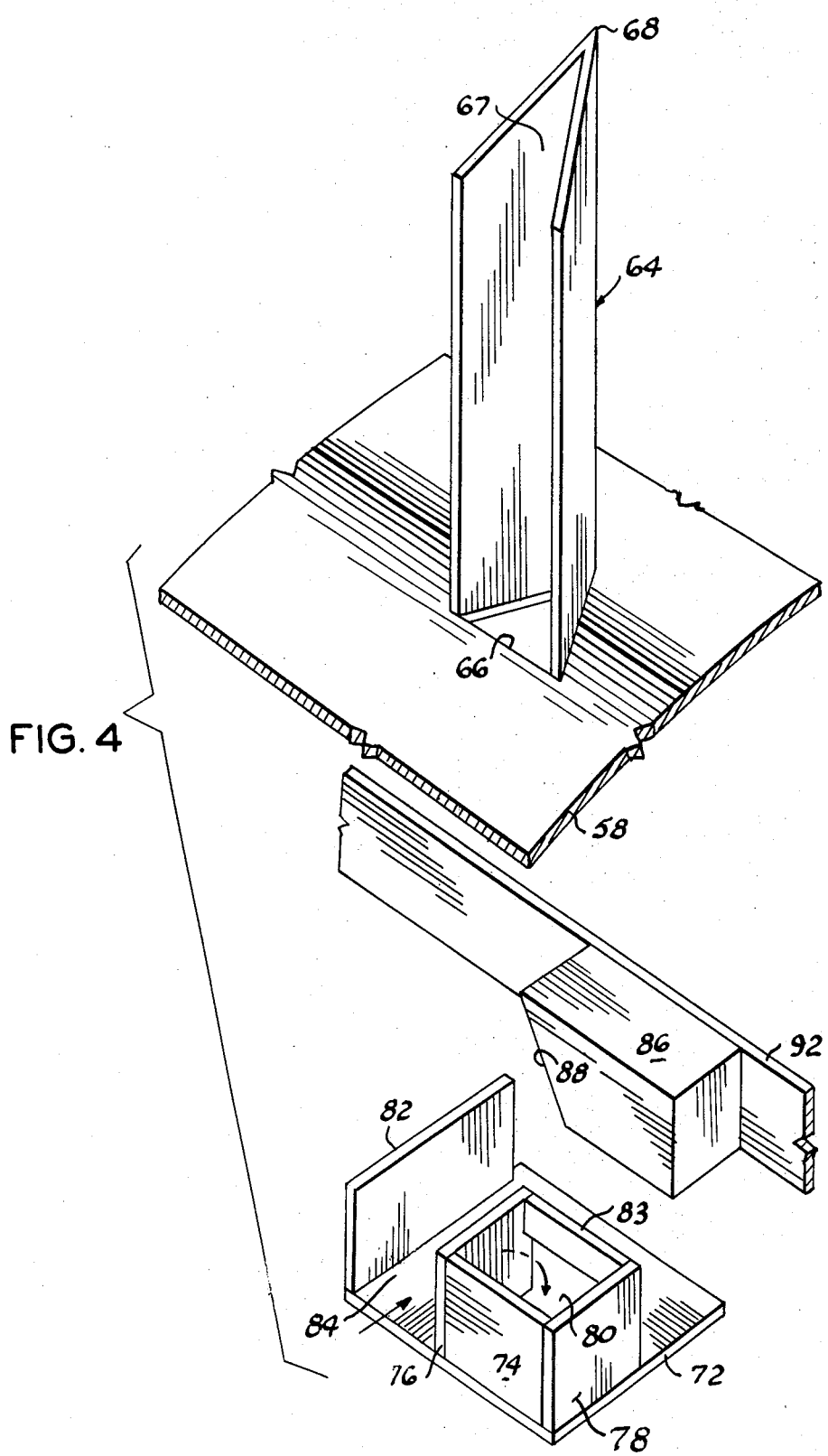
FIG. 4 is a fragmentary exploded perspective view, to a further enlarged scale, of one of the seed receiving and dispensing hoppers illustrating its relationship to one of the soil penetrating punches.
Figure 5:
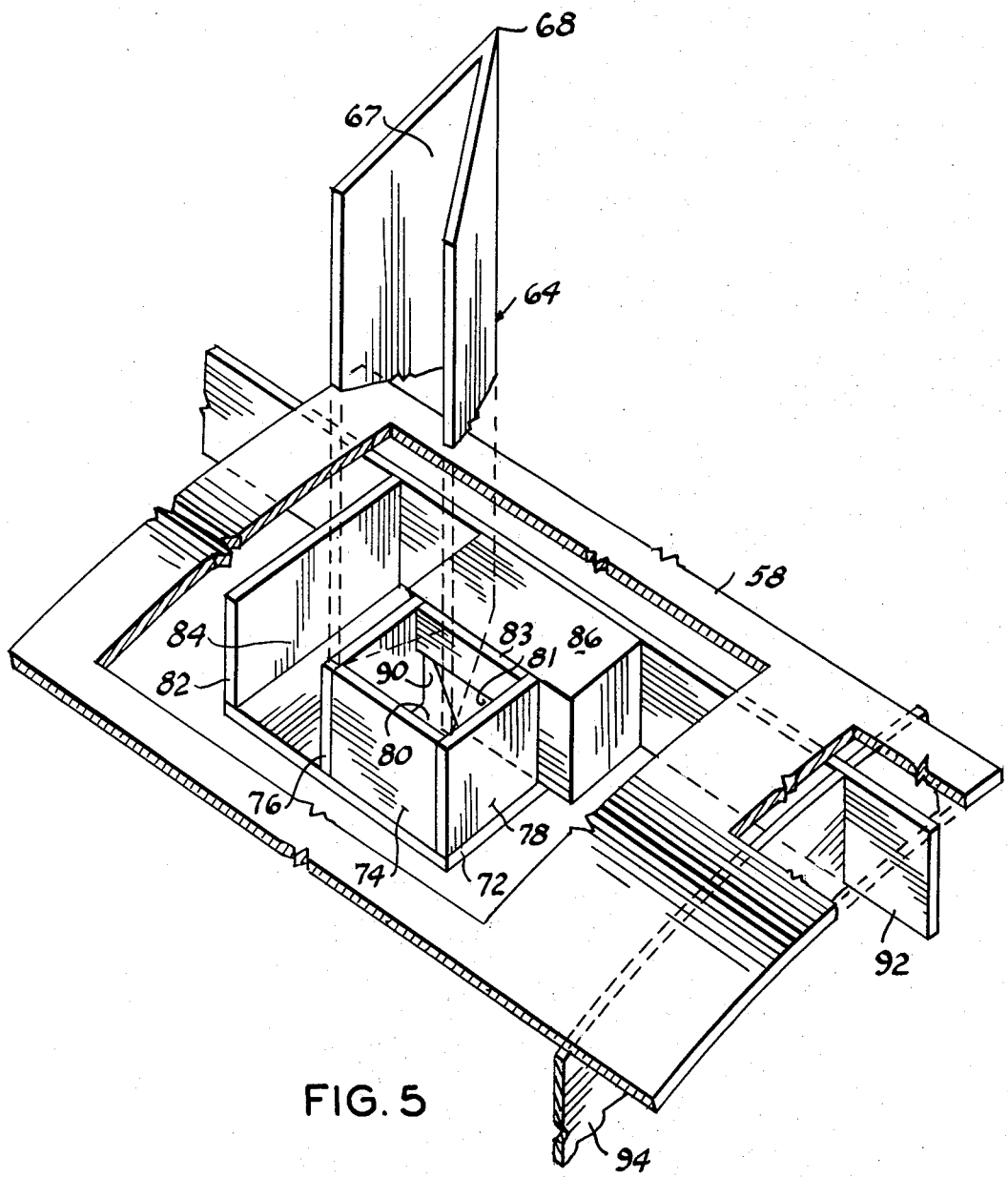
FIG. 5 is a fragmentary perspective view illustrating the components of FIG. 4 in assembled relation and illustrating the manner of mounting a gate control bar within one end wall of the cylinder; and, FIG. 6 is a fragmentary perspective view, from another angle, of one of the seed hoppers with the overlying cylinder wall and punch removed.

Like characters of reference designate like parts in those figures of the drawings in which they occur.

In the drawings:

The reference numeral 10 indicates the device, as a whole, comprising a frame 12 supported by a pair of wheels 14 and connected with a tongue 16 adapted to be connected with a prime mover, or the like, not shown. The frame 12 includes forward and rearward rod or tube members 18 and 20, respectively, rigidly connected by transverse end brace members 22 and an intermediate brace member 23. At the respective ends of the frame, the tube 20 is connected with one end of a stub axle 24, only one being shown, journalling the respective wheel, by a support 26. The forward tube 18 is surrounded by a pipe 28 between the end cross braces 22. The respective end portion of the pipe 28 is connected with the end of the respective stub axle 24 by a toggle link 30. A box channel 32 longitudinally surrounds the pipe 28 between its connection with the toggle links 30 and is connected with the forward end portion of the frame intermediate cross brace 23 and is also connected with the rearward end portion of the tongue 16. A hydraulic cylinder 34, supported at one end by the cross brace 23, has its piston connected with pivoting linkage 36 connected with the pipe 28 intermediate its ends for rotating the pipe 28 about the axis of the frame tube 18 and vertically pivoting the toggle links 30 in raising and lowering the frame 12 with respect to the surface of the earth. The hydraulic cylinder 34 is operated by hydraulic fluid lines from the prime mover, not shown.

The frame 12 supports a plurality, two in the example shown, of cylindrical seed containers and planters 40. Each cylinder 40 is coaxially provided with an axle 42 journalled at its respective ends by bearings 44 respectively connected with end members 46 forming a part of a floating frame 48 for each cylinder. In addition to the end members 46, the floating frames 48 each include forward and rearward bars 50 and 52, respectively. The floating frame forward bar 50 is connected medially its ends to a brace or bracket 54 secured to and depending from the channel member 32. The floating frame rearward member 52 is similarly secured to the depending end of a similar bracket 56 connected with the frame rearward member 20. Thus, the floating frame 48 is free to pivot vertically at its respective ends about the horizontal axis defined by the connection of its forward and rearward members with the brackets 54 and 56 for the purpose of permitting the axis of the respective cylinders 40 to travel in parallel spaced relation with respect to the surface of the earth over which the cylinders 40 are being moved and allow the cylinders to pivot vertically with the floating frames thus compensating for irregularities in the surface of the earth.

The wall 58, of each cylinder, is provided with an opening covered by a removable door 60 for placing a quantity of seed 62 to be planted therein. A plurality of rows of soil engaging and penetrating punches 64 are longitudinally secured to the outer surface of the respective cylinder wall 58 and extended radially outwardly therefrom in circumferential spaced relation with the punches in each row staggered with respect to the punches in adjacent rows. In the example shown, the punches are preferably V-shaped in transverse cross section having one end connected with the cylinder wall 58 for communication with cooperating V-shaped seed discharging openings 66 formed therein. The legs of each V-shaped punch 64 are arranged to project toward the direction of rotation of the cylinders 40 and form a laterally open seed passing cavity 67 and the free end of each punch has the legs thereof angularly cut off so that the free end of each punch forms a sharpened tip end 68.

A like plurality of hoppers 70, one for each punch 64, are secured to the inner surface of the cylinder wall 58. The hoppers 70 each comprise a rectangular plate 72 subtending an arc of the inner surface of the cylinder wall 58 in spaced relation with respect to the punch openings 66. An end panel 74, secured to an edge surface of the plate 72 and joined to side panels 76 and 78, form three sides of a rectangular seed dispensing chamber or well 80 in communication with the respective cylinder opening 66. A fence-like wall 82, secured to the end surface of the plate 72, in parallel spaced relation with respect to the panel 76, forms, in cooperation with the overlying cylinder wall 58, a gravity fed seed receiving chamber or reservoir 84 which communicates with the open side 81 of the well opposite the panel 74. A rectangular block-like member 86 is interposed between the plate 72 and inner surface of the cylinder wall 58 and is slidable longitudinally of the respective cylinder and spans the seed dispensing well open side wall opening 81 to form a gate for permitting and interrupting communication between the well 80 and reservoir 84. One corner portion of the block 86 is angularly cut off, as at 88, to easily increase and decrease the size of a passageway or orifice 90 thus formed between the reservoir 84 toward the plate 72 and the well 80 for the purposes presently explained.

Each block 86 is connected with a control bar 92 extending longitudinally through the end walls 94 of the cylinder 40 adjacent its inner periphery for moving the blocks 86 to regulate the size of the seed orifice 90 and control the quantity of seeds 62 admitted to the seed dispensing well 80. The control bar 92 also closes the adjacent end of the gravity filled seed reservoir 84 leaving the other end of the reservoir open toward the direction of rotation of the cylinder.

Intermediate its ends each cylinder 40 is surrounded with a plurality, two in the example shown, of rods or bands 96 forming depth control means for limiting the soil penetrating action of the punches, as desired. Each of the bands 96 comprises a pair of substantially semicircular sections 98 and 100, adjustably interconnected at their respective ends, for increasing and decreasing the spacing between the bands and the periphery of the cylinders. The sections 98 and 100 are each connected with the periphery of the cylinder by adjustable brackets 102.

OPERATION

In operation a selected quantity of the seed 62 to be planted is placed within each cylinder 40.

As stated hereinabove, the device 10 is drawn in trailer-like fashion by a prime mover, not shown, across the area to be seeded or planted. Seed planting is accomplished by operating the hydraulic cylinder 34 to pivot the toggle links 30 downwardly thus lowering the frame 12 with respect to the wheels 14 and positioning the cylinders 40 adjacent the surface of the earth so that the punches 64, by the mass of the cylinders 40, engage and penetrate the surface of the earth, indicated by the line 104, with the depth of penetration of the soil being limited by the bands 96. The punches 64, penetrating the soil, induce angular rotation of the cylinders 40 about their longitudinal axis. As the cylinders rotate, the hoppers 70, at the lowermost portion of the cylinder, are covered by the seed 62 so that as the respective hoppers are rotated, in the direction shown by the arrow (FIG. 3), the seed 62 enters and fills the hopper seed reservoir 84 so that as the respective hopper is rotated through an angle of approximately 90° and the reservoir 84 is disposed substantially vertically a portion of seed 62 passes, by gravity, through the orifice 90 into the seed dispensing well 80 by the time the respective hopper has been rotated through substantially 180°. As the respective hopper then moves through the next 90° of rotation excess seed, contained by the seed reservoir 84, falls by gravity out of the reservoir leaving only that quantity of seed within the seed dispensing well 80 trapped therein. A desired angular rate of rotation of the cylinder 40 which, by a little trail and error, the size of the seed being planted and the adjusted size of the orifice 90, may be readily determined, must be above a minimum rate of travel across the soil, maintains some of the seed within the seed dispensing well 80 by the centrifugal forces generated by the angular rate of rotation. Since the seed dispensing well 80 is rectangular and the seed discharge opening 66 is V-shaped, a seed retaining recess is formed by the partial mismating fit so that some of the seed is lodged against the inner surface of that portion of the cylinder wall 58 overlying the rectangular opening of the seed dispensing well 80 so that, as the respective punch 64 angularly enters the surface of the earth, most of the seed within the well 80 falls by gravity through the punch seed passing cavity 67 and enters the socket formed in the soil by the punching action of the respective punch. The respective punch initially enters the soil in angular relation with respect to the vertical and leaves the soil at an opposite substantially equal angle thus forming a loosening of the soil and a seed covering action so that the remaining seeds are discharged into the soil through the punch seed passing cavity as the punch is leaving the soil.

In the event the soil being planted is unbroken sod or is hard packed, to such an extent that the punches do not readily enter the soil, the hydraulic cylinder 34 may be activated for pivoting the toggle links 30 downwardly to impart and maintain a force against the respective cylinder 40 to insure adequate soil penetrating action and a loosening of the soil penetrated to insure seed covering action.

Obviously the invention is susceptible to changes or alterations without defeating its practicability, therefore, I do not wish to be confined to the preferred embodiment shown in the drawings and described herein.

I claim:

1. A seed planter comprising:
   a frame;
   a hollow cylinder, adapted to contain seed to be planted, mounted within said frame for rolling movement across the surface of the earth;
   a plurality of rows of soil penetrating punches, each having a seed passing cavity, longitudinally secured to the periphery of said cylinder in circumferentially spaced radially outward projecting relation, said cylinder having a like plurality of seed discharging openings in its wall communicating with the seed passing cavity of said punches;
   a like plurality of gravity filled and emptied seed hopper means secured to the inner wall surface of said cylinder defining a pair of juxtaposed chambers communicating with the seed discharging openings; and,
   control means including a gate slidably engaging each said hopper and normally forming an orifice between the hopper chambers.

2. The seed planter according to claim 1 in which said hopper means includes:
   a plate subtending an arc of the inner periphery of the cylinder wall;
   a plurality of panels arranged in planes normal to the plane of said plate and interposed between said plate and said cylinder wall in chamber forming relation,
   one of the chambers forming a seed receiving reservoir open toward the direction of rotation of said cylinder, and the other chamber forming a seed dispensing well having a side opening.

3. The seed planter according to claim 2 in which said control means further includes:
   a control bar extending longitudinally slidable through said cylinder adjacent the respective hopper means in each said row for closing the end of the reservoir opposite its open end;
   said gate comprising a block secured to said control bar for admitting and interrupting communication between the reservoir and the seed dispensing well by to and fro movement of said control bar,
   said block having a triangular shaped surface disposed adjacent the juncture of the reservoir with the seed dispensing well and facing toward the open end of the reservoir and the side opening of the seed dispensing well.

4. The seed planter according to claim 3 in which the cylinder seed discharging openings are V-shaped and said punches are cooperating V-shaped in transverse cross section and are disposed with the legs of the V-shape projecting toward the direction of rotation of said cylinder.

5. The seed planter according to claim 4 in which the seed dispensing well is rectangular shaped and is partially mismated with the respective cylinder seed discharge opening for trapping at least some of the seed to be planted within the seed dispensing well until the respective said punch has completed its soil penetrating action.

6. The seed planter according to claim 5 and further including: a plurality of endless bands circumferentially surrounding and secured in adjustable spaced-apart relation to the periphery of said cylinder, intermediate its ends, for limiting the soil penetrating depth of said punches.

* * * * *